UNITED STATES PATENT OFFICE.

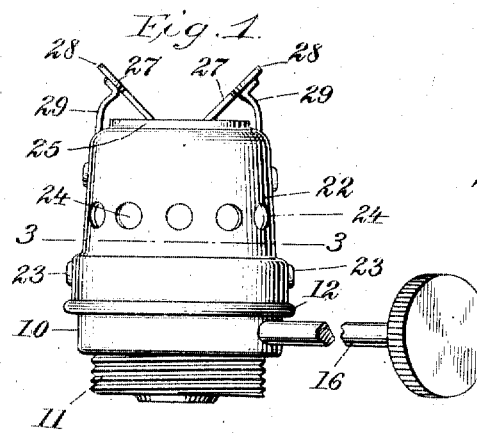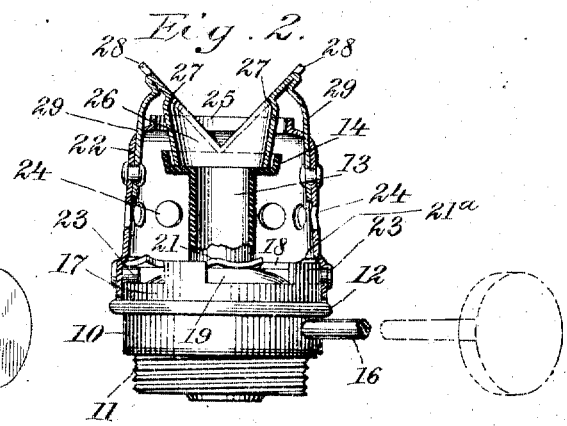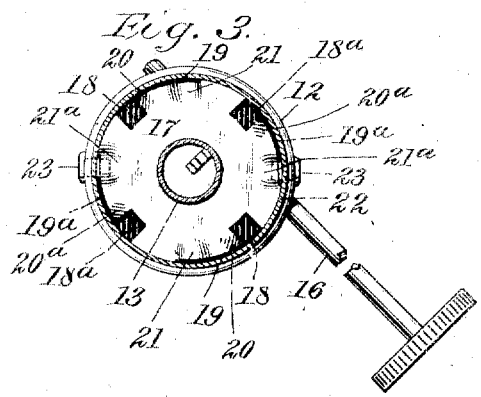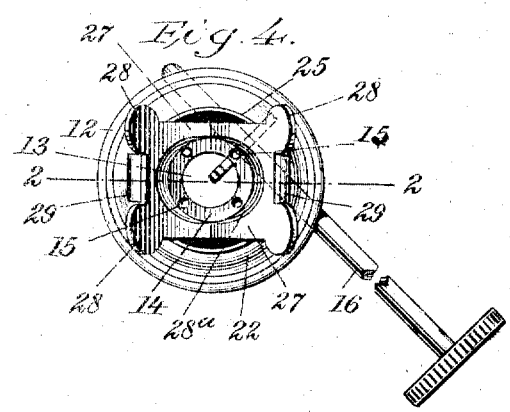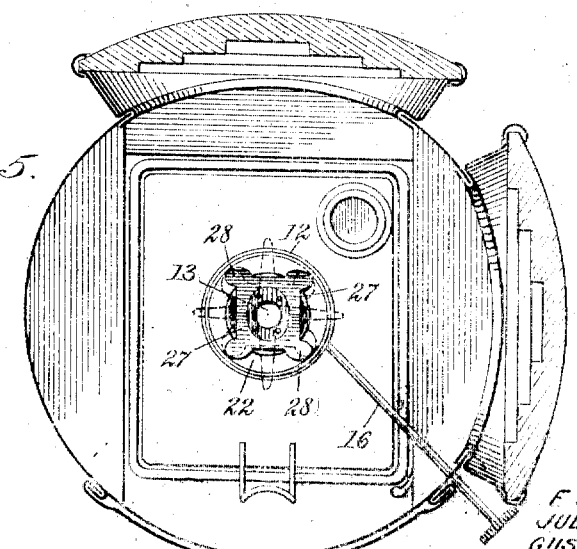

FREDERICK W. DRESSEL, OF NEW YORK, N. Y., JULES DAWANS, OF LYNDHURST, NEW JERSEY, AND GUSTAV EKLUND, OF NEW YORK, N. Y., ASSIGNORS TO THE DRESSEL RAILWAY LAMP WORKS, OF NEW YORK, N. Y., A CORPORATION OF NEW YORK.

LONG-TIME BURNER.

1,230,137.   Specification of Letters Patent.   Patented June 19, 1917.

Application filed August 10, 1912. Serial No. 714,339.

*To all whom it may concern:*

Be it known that we, FREDERICK W. DRESSEL, a citizen of the United States, residing in the city of New York, borough of Manhattan, in the county and State of New York, JULES DAWANS, a subject of the King of Belgium, residing at Lyndhurst, Bergen county, in the State of New Jersey, and GUSTAV EKLUND, a citizen of the United States, residing at the city of New York, borough of the Bronx, in the county and State of New York, have invented certain new and useful Improvements in Long-Time Burners, of which the following is a full, clear, and exact specification.

Our invention relates to improvements in lamp burners, of the type known as long time burners, and the same has for its object to provide a simple, efficient and reliable burner for signal and other lamps, which burner will produce a flat flame yielding a clear, steady white light.

Further said invention has for its object to provide a long time burner employing a round wick and producing a flat flame without the use of a chimney.

Further said invention has for its object to provide a burner more particularly adapted for use in signal and semaphore lamps having lenses arranged in two or more of their sides, and which burner will permit of the easy adjustment of the flame in order that its flat or broad side may be arranged parallel with the inner surface of one or more of the surfaces of said lenses.

Further said invention has for its object to provide a burner in which the flame-spreading or flattening means may be readily adjusted to change the angle of said flame, without necessitating the detaching of the burner from its oil font, or changing the position of said oil font within the lantern.

Further said invention has for its object to provide a burner in which the working parts may be readily taken apart to permit of the cleaning of the burner and the dressing of the wick.

To the attainment of the aforesaid objects and ends, our invention consists in the novel details of construction, and in the combination, connection and arrangement of parts hereinafter more fully described and then pointed out in the claims.

In the accompanying drawing forming part of this specification, wherein like numerals of reference indicate like parts,—

Figure 1 is a side view showing one form of long time burner constructed according to, and embodying our said invention;

Fig. 2 is a central, vertical section taken essentially on the line 2—2 of Fig. 4;

Fig. 3 is a transverse section on the line 3—3 of Fig. 1;

Fig. 4 is a top view of the burner; and

Fig. 5 is a transverse section of a signal lantern showing the oil font and burner in position therein, and in broken lines showing the flame spreader adjusted to a position at ninety degrees to that shown in full lines.

In said drawings, 10 designates the base portion of a burner having a reduced end 11 which is screw-threaded for application to the oil font. 12 denotes an annular rim arranged upon the side of said base adjacent to its top.

13 denotes the wick tube which extends centrally through said base 10, and end 11, and has its upper portion projecting above the upper side of said base 10, and its end provided with a cup 14 having air ports 15, 15 arranged in the bottom thereof.

16 denotes the wick raising shaft which extends into said base 10, and is provided at its inner end with a ratchet wheel extending through an opening in the wick tube and engaging the wick therein.

Upon the upper side of the base 10 is rigidly secured a cap 17 which has the lower edge of its vertical side portion resting upon the annular rim 12.

The upper portion or top of said cap 17 is provided along its edge with four equidistantly arranged recesses 18, 18$^a$ which open into circumferential slots 19, 19$^a$ arranged in the vertical side portion of said cap. The peripheral portions of the cap 17 adjacent to the recesses 18, 18$^a$ are bent upwardly at 20, 20$^a$, and directly above the inner ends of said slots 19, 19$^a$ the under side of the cap 17 is provided with radial indentations 21, 21$^a$.

22 denotes an adjustable cone which is adapted to be fitted upon the base 10, and incloses the wick tube 13, and cup 14 thereon. The said cone 22 is provided adjacent to its lower edge with oppositely-arranged inwardly-projecting studs 23, 23, which are adapted to enter the recesses 18, 18$^a$, and slots 19 19$^a$, and frictionally engage with the indentations 21, 21ᵃ arranged in the cap 17, in order to hold said cone 22 in its adjusted position upon said base.

The tapering wall of said cone 22 is provided near its lower edge but above the studs 23, 23, with a horizontal row of air inlet openings 24, and the upper end of said cone 22 is provided with a constricted throat 25, in which is rigidly secured a flame spreader comprising a slightly tapering neck section 26, which extends from the upper side of the cup 14, to the upper edge of the throat 25, and a pair of inclined plates or wings 27, 27, having their lower ends in contact with each other. Each of said plates or wings 27, 27 has its inner edge provided with a semi-circular recess, which jointly form a circular opening 28ᵃ between the inner contacting ends of said plates or wings, which opening corresponds substantially in diameter with the interior of the cup 14. The upper edges of said plates or wings are each provided at their opposite ends with semi-circular projections 28, 28.

The upper ends of said plates or wings 27, 27, which project above the top edge of the throat 25, are firmly secured in position within said cone 22 by supports 29, 29, which have their upper ends secured to the outer sides of the projecting portions of said plates or wings 27, 27, and their lower ends extending through openings provided in the top of said cone, and then suitably secured against the inner side thereof.

The operation of the burner is as follows:

In order to cause the lamp arranged within a signal lantern containing a plurality of lenses to burn with its flat flame parallel with the inner surface of the particular lens, or lenses, (if the same are arranged oppositely to each other,) it merely becomes necessary to adjust the cone 22, relatively to the base 10 in such manner that the spreader plates 27, 27, will have their inclined edges parallel with such lens or lenses. The cone will be held firmly in position upon the base 10 by the frictional engagement of the studs 23, 23, with the indentations 21, 21ᵃ, arranged in the top of the cap 17 directly above the inner ends of the slots 19, 19ᵃ. The air necessary to supply the proper amount of oxygen to the flame being received partly through the air inlets 24 in the cone 22, the air vents 15, 15 in the base of the cup 14, and over the lower contacting edges of the inclined plates or wings 27, 27.

When it is desired to change the horizontal longitudinal axis of the flame in order that the same shall be parallel with the lens or lenses arranged in other sides of the lantern, it merely becomes necessary to remove the cone 22 by releasing the studs 23, 23 thereof of their engagement with the recesses 18, 18, and slots 19, 19, and give said cone a quarter turn in order to allow said studs to engage with the recesses 18ᵃ, 18ᵃ, and slots 19ᵃ, 19ᵃ, thereby causing the spreader plates 27, 27 to assume a position at right angles to their former position, and consequently also cause the flame to assume a position at right angles to its former position, and thus bring the same parallel with the other lens or lenses of the lantern.

By means of our improved construction of burner, we obviate the necessity of making a plurality of similar lamps each having its burner fixed at a different angle relatively to the lamp in order to bring the flat side of the flame parallel with the inner side of the lens located in a given side of the lantern.

Having thus described our invention, what we claim and desire to secure by Letters Patent is:—

1. A lamp burner comprising a base having a plurality of recesses therein, a wick tube mounted in said base, a supporting member, a flame spreader carried thereby, and means arranged upon said supporting member to engage with certain of the recesses in said base to hold said flame spreader in one position relatively to said wick tube, and to engage with other of said recesses to hold said flame spreader in a different position relatively to said wick tube, substantially as specified.

2. A lamp burner comprising a base, a wick tube arranged thereon, a cup secured to the top of said wick tube, a cone secured to said base having a series of air inlet openings therein, a contracted neck extending from said cup to the top of said cone, and a pair of inclined plates arranged partly within, and partly without said cone, substantially as specified.

3. A lamp burner comprising a base, having a plurality of recesses therein, a wick tube centrally mounted in said base, a cone, a flame spreader secured in said cone, and members arranged in said cone adapted to engage with certain of the recesses in said base to hold said cone attached thereto and support said flame spreader horizontally in one position relatively to said wick tube, and to engage with other of said recesses to support said flame spreader horizontally in a different position relatively to said wick tube, substantially as specified.

4. A lamp burner comprising a base, a wick tube centrally mounted in said base, a cup secured to the top of said wick tube and having air vents in its bottom, a cone having a series of air inlets adjacent to its base, a contracted neck extending from said cup to the top of said cone, a pair of inclined plates arranged partly within, and partly without said cone, and means for securing said cone to said base horizontally in a plurality of positions whereby to vary the angle of longitudinal axis of said inclined plates relatively to said wick tube, substantially as specified.

5. A lamp burner comprising a base, a wick tube centrally mounted in said base, a cup secured to the top of said wick tube and having air vents in its bottom, a cone having a circular series of air inlets adjacent to its base, a pair of longitudinal spreader plates arranged at an angle to each other in the top of said cone above said wick tube, a cap secured to said base having several sets of slots therein, and studs on said cone adapted to engage with one set of said slots to support said spreader plates in one position relatively to said wick tube, and to engage with other of said sets of slots to support said spreader plates in other positions relatively to said wick tube, substantially as specified.

Signed at the city of New York, in the county and State of New York, this 18th day of July, nineteen hundred and twelve.

FREDERICK W. DRESSEL.
JULES DAWANS.
GUSTAV EKLUND.

Witnesses:
CONRAD A. DIETRICH,
JOSEPH G. QUINN, Jr.